Oct. 25, 1938.  G. C. PEARCE  2,134,056

REFRIGERATING APPARATUS

Original Filed Dec. 30, 1933  5 Sheets-Sheet 2

INVENTOR.
George C Pearce
BY Spencer Hardman and Fehr
ATTORNEYS

Oct. 25, 1938.　　　G. C. PEARCE　　　2,134,056
REFRIGERATING APPARATUS
Original Filed Dec. 30, 1933　　5 Sheets-Sheet 3
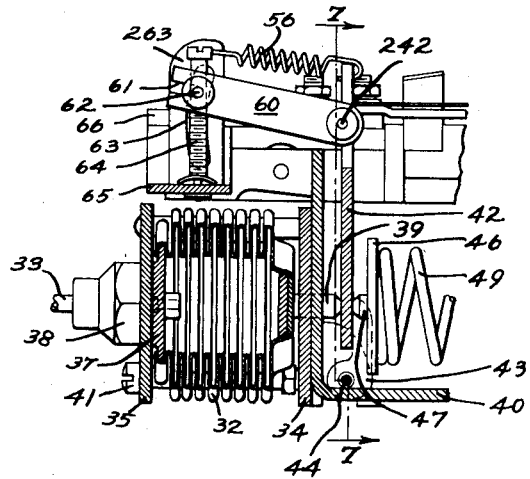
Fig. 6
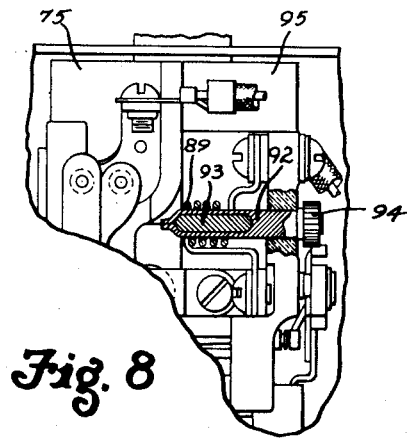
Fig. 7
Fig. 8
INVENTOR.
George C. Pearce
BY Spencer Hardman and Fehr
ATTORNEYS Oct. 25, 1938.  G. C. PEARCE  2,134,056
REFRIGERATING APPARATUS
Original Filed Dec. 30, 1933   5 Sheets-Sheet 4

INVENTOR:
George C Pearce
BY
Spencer Hardman and Fehr
ATTORNEYS

Oct. 25, 1938.  G. C. PEARCE  2,134,056
REFRIGERATING APPARATUS
Original Filed Dec. 30, 1933    5 Sheets-Sheet 5

INVENTOR.
George C Pearce
BY Spencer Hardman and Fehr
ATTORNEYS

Patented Oct. 25, 1938

2,134,056

UNITED STATES PATENT OFFICE 2,134,056

REFRIGERATING APPARATUS

George C. Pearce, Dayton, Ohio, assignor to General Motors Corporation, Dayton, Ohio, a corporation of Delaware Original application December 30, 1933, Serial No. 704,685. Divided and this application November 10, 1937, Serial No. 173,884

13 Claims. (Cl. 200—81)

This invention relates to refrigerating apparatus and more particularly to control means therefor.

This application is a division of my copending application entitled "Refrigerating apparatus", Serial No. 704,685, filed December 30, 1933.

It is an object of my invention to provide for refrigerating apparatus and other means an improved switch having great flexibility as to range and differential adjustments and which will be equally applicable for use with alternating and direct current so that it may be easily and readily adjusted to fill the requirements of a wide range of situations.

It is another object of my invention to provide a switch means having an improved readily removable bellows assembly provided with protective means for preventing undue expansion of the bellows when removed from the remainder of the switch means and which serves as a useful part when connected to the remainder of the switch means.

It is a further object of my invention to provide an improved overload means for a magnet type switch having an improved resetting means which prevents the forcible closing of the circuit under overloading conditions.

It is another object of my invention to provide an improved snap acting means for controlling the operation of a bellows and switch means which will accommodate misalignment without being affected in its operation in any substantial way.

Further objects and advantages of the present invention will be apparent from the following description, reference being had to the accompanying drawings, wherein a preferred form of the present invention is clearly shown.

In the drawings:

Fig. 6 is a side sectional view of the lower portion of the pressure responsive assembly disclosing the differential adjusting means;

Fig. 7 is a sectional view along the line 7—7 of Fig. 6;

Fig. 8 is a fragmentary top view of the pressure responsive assembly including switch contacts and overload means;

Figure 1:
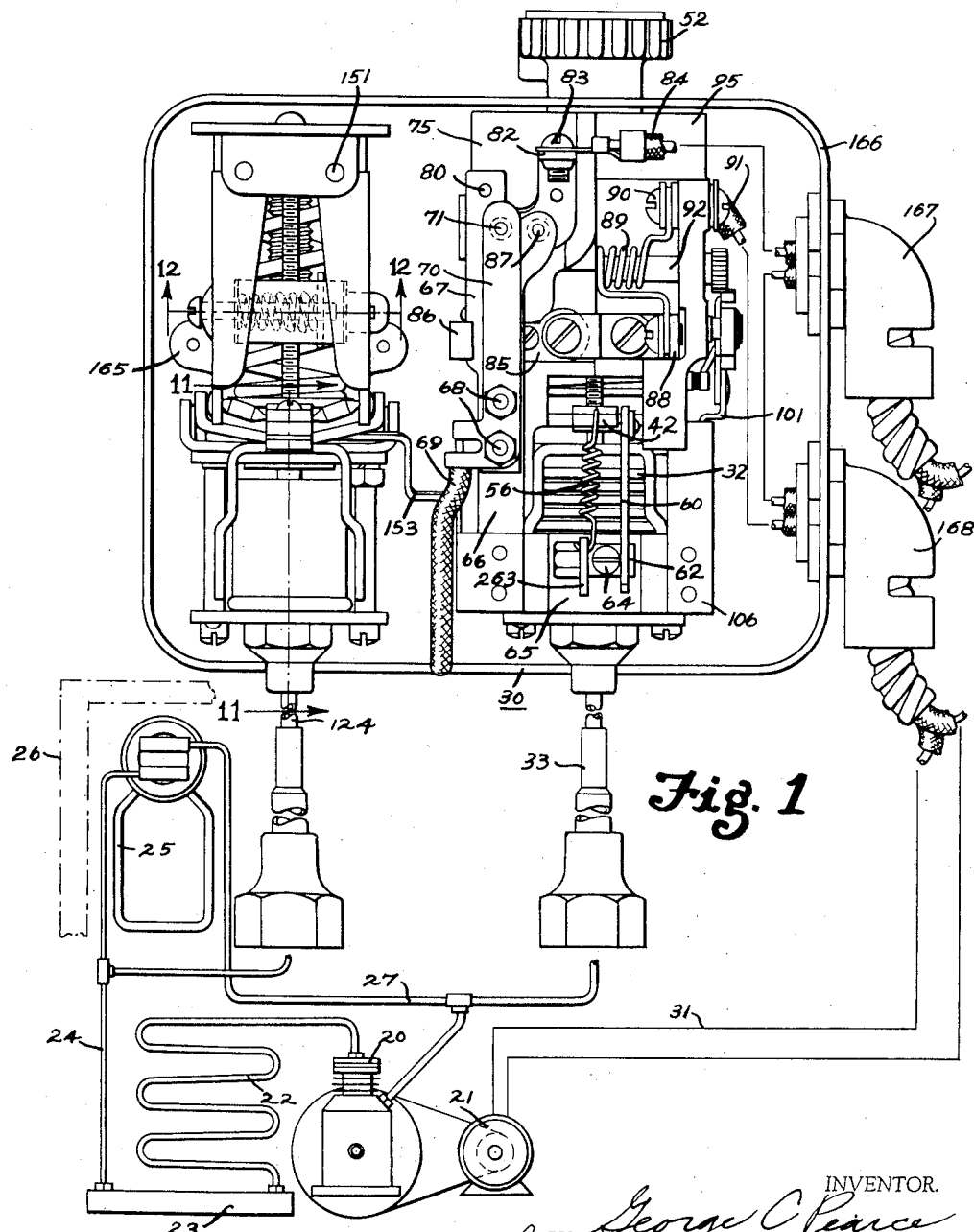
Fig. 1 is a view of a refrigerating system including my improved control means.

Referring to the drawings and more particularly to Fig. 1, there is shown a refrigerant liquefying means including a compressor 20 driven by an electric motor 21 for compressing the refrigerant and for forwarding the compressed refrigerant to a condenser 22 where the refrigerant is liquefied and collected in a receiver 23. From the receiver 23, the liquid refrigerant is forwarded through a supply conduit 24 to an evaporating means 25, which, as shown, may be of the low side float controlled flooded type or any other suitable evaporating means. The evaporating means is located within an insulated cabinet 26 and by the evaporation of the liquid refrigerant therein removes heat from the cabinet. This evaporated refrigerant is returned to the compressor 20 through the return conduit 27. The operation of the refrigerant liquefying means, and particularly the operation of the electric driving motor 21, is controlled by a control means or switch 30 which controls the supply of electric energy thereto through the supply conductors 31. The control means 30 is operated by a bellows 32 which is connected by tubing 33 to the return conduit 27. By this connection the bellows 32 is responsive to the pressure and therefore the temperature of the evaporating means 25.

Figure 2:
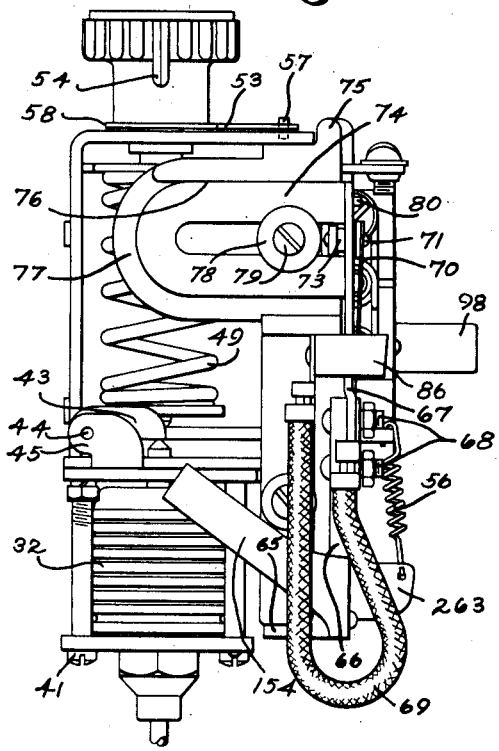
Fig. 2 is a left side view of the pressure responsive assembly of the control means shown in Fig. 1.
Figure 3:
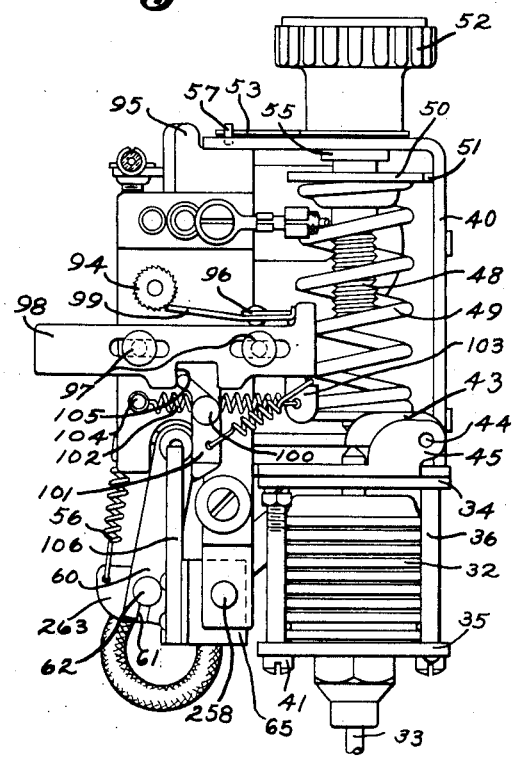
Fig. 3 is a right side view of the pressure responsive assembly of the control means shown in Fig. 1.

As better shown in Figs. 2 and 3, the bellows 32 are located between two generally square, flat, upper and lower plates 34 and 35. At the opposite corners of the plates the plates are connected by pins 36 which are provided with shoulders at their ends and a reduced portion which passes through the plates and is riveted over onto the opposite sides thereof so as to hold the plates in spaced relation.

As more particularly shown in Fig. 6, the bellows 32 is fastened to the lower plate 35 by having its bottom plate 37 seated upon the lower plate 35 and fastened thereto by means of the nut 38 which surrounds the upper end of the tube 33. The upper plate 34 serves as a stop to prevent undue expansion of the bellows under high pressure conditions within the system, such as are prevalent when the system is shut down. The upper plate 34 is provided with an aperture through which extends a pin 39 which is connected to the movable end of the bellows 32. This entire bellows assembly including the bellows 32, the tube 33, the upper and lower plates 34 and 35, as well as the riveted pins 36 is fastened to a U-shaped bracket 40 by means of long machine screws 41 which pass through the remaining two corners of both the upper and lower plates 34 and 35.

A pin 39 extending from the bellows assembly is provided with a conical point which projects into a recess provided in a bellows follower 42 which is provided with a pair of ears 43 at one end, which are pivoted upon a pivot pin 44, better shown in Fig. 7. This pivot pin 44 is supported by the pair of ears 45 projecting from the U-shaped bracket 40. The expansion of the bellows 32 is opposed by a spring adjusting means including a lower spring retainer 46 provided with a conical point 47 seated upon the bellows follower 42 substantially opposite the conical point of the pin 39 extending from the bellows assembly. Seated upon the spring retainer or spring seat 46 is a rather stiff heavy coil spring 49 which is concentric with an adjusting screw 48 having threaded thereon the upper spring retainer 50 which holds and confines the spring 49 between it and the lower spring retainer 46. The upper spring retainer is provided with a projection 51 which is guided by a slot in the upper end of the U-shaped bracket 40 in order to prevent the spring retainer 50 from turning when the screw 48 is turned. The tension of the spring 49 is adjusted by turning the control knob 52 adjustably connected to a serrated disc 58 at the top of the screw 48. The knob 52 is preferably provided with an arm 53 cooperating with a pin 57 to limit its normal rotation to one revolution in order to prevent any unauthorized person from adjusting the tension of the spring so as to prevent the proper operation of the switch. The knob 52 is provided with suitable indicating means, such as shown at 54 in Fig. 2, to indicate the proper normal position of the control knob 52. The control knob 52 is fastened to the screw 48 by a small threaded screw so that it is removable together with arm 53 so that the service man is permitted to turn a screw 48 to any amount he desires. The upper end of this screw 48 is provided with a flange 55 which bears against the upper end of the U-shaped bracket 40.

The bellows follower 42 at its free end is pivotally connected by a pin 242 to a link 60, which at its lower end is provided with a slot 61 slidably receiving a pin 62 which passes through and is slidably mounted within an arcuate slot 63 provided in an arm 263 extending from the U-shaped member 65. The location of the pin 62 within the arcuate slot 63 is controlled by a long thin screw 64 extending in substantially the same direction as the arcuate slot 63 and which has an enlarged portion of the pin 62 threaded thereon. The screw 64 has its end rotatably and flexibly mounted within the U-shaped member 65 and is thus secured against longitudinal movement in the U-shaped member 65 to which the arm carrying the arcuate slot is fastened.

The location of the pin 62 within the arcuate slot 63 determines the differential of the switch by changing the distance of the pin 62 from the fulcrum pins 258 upon which the U-shaped member 65 pivots. In order to increase the differential between the cut-in and cut-out points upon the switch the long thin screw 64 is turned so as to move the pin 62 inwardly closer to the pivot pins 258 upon which U-shaped pin 65 is pivoted. In order to decrease the differential the screw 64 is turned in the opposite direction so as to move the pin 62 outwardly. The arm 263 having the arcuate slot 63 has its inner end rigidly fastened to the U-shaped member 65. A tension spring 56 connects the bellows follower and the end of the arm 263 having the arcuate slot 63 so as to normally hold the pin 62 in the inner end of the slot 61 in the link 60. However, should any resistance be encountered which is greater than the tension of the spring 56 the pins 62 will be permitted to move away from the inner end of the slot 62 against the tension of the spring 56.

Connected to one side of the U-shaped member 65 by rivets is an insulating strip 66 which carries an armature arm 67 of magnetic material fastened thereto by nut and bolt means 68. It should be noted that there is provided a rigid assembly which includes the U-shaped member 65, the member 263, the insulating arm 106, the arm 154, the insulating strip 66, the armature arm 67, and the flexible contact member and which assembly pivots about the pivot pins 258 which pass through the U-shaped member 65 and the insulating members 75 and 95 which with the U-shaped member 40 form the non-movable supporting frame of the switch. This nut and bolt means serves as a binding post to connect the electrical conductor 69 to the flexible contact member 70, preferably of spring brass, which is fastened to the top of the armature arm 67 by the nut and bolt means 68. This spring brass strip 70 is provided with a silver or silver plated contact 71 at its free end which projects through a necked in portion at the free end of the armature arm 67 and contacts with a cooperating contact 73 which is located between the ends of a U-shaped permanent magnet 74. This U-shaped permanent magnet 74 is mounted upon an insulating member 75 of hard rubber, or some suitable phenol condensation product. This insulating member 75 is provided with a flange 76 against which one side of the U-shaped magnet is held so as to provide a lateral locating means for the permanent magnet while a suitable plane face 77 is provided upon the side of the insulating member 75 in order to properly support one face of the permanent magnet 74. The permanent magnet 74 is adjustably held in place by means of the washer 78 and an adjusting screw 79 in order to vary the location of the permanent magnet with respect to the fixed contacts 73. The armature arm is provided with a small screw 80 which contacts with the permanent magnet 74 and which adjusts the minimum distance between the armature arm and the permanent magnet so as to pervent the armature arm from freezing to the permanent magnet.

The permanent magnet 74 sets up a magnetic field between the contacts and thus snuffs out any arc which might pass between the contacts by the action of an electric turn in a magnetic field. This is particularly valuable in connection with direct currents and enables the switch to have a relatively high direct current rating so that it may be used for both alternating and direct current. In addition to snuffing out the arc, the permanent magnet also aids in giving a snap movement to the armature arm. This also aids in preventing arcing at the contacts. With this arrangement, the differential between the cut-in and cut-out points may be made very small. The spring and slot link connection provided by the link 60, the slot 61, the pin 62, and the spring 56 prevents any force greater than the tension of the spring 56 from being applied to the armature arm 67 so that any damage to the armature arm because of excessive expansion of the bellows 32 is avoided.

The stationary contact 73 is mounted upon an L-shaped brass or copper strip conductor 81 fastened to the top of the insulating member 75, which member is provided with an ear 82 and a binding screw 83 for fastening the electrical conductor 84 thereto. The electrical conductor 69 which receives electrical energy from the conductor 84 through the L-shaped member, the stationary contact 73, the movable contact 71, and the spring brass strip 70 is connected to a brass strip conductor 85 which has a turned up end portion 86 which limits the upward or outward movement of the armature arm 67. If desired, the armature arm 67 may be provided with a contact 87 which cooperates with a contact mounted upon the L-shaped member 81.

The brass strip conductor 85 is provided with an ear 88 at its opposite end to which is connected a coiled heater wire 89 which is connected by a binding post 90 to the electrical conductor 91 leading to the electrical motor 21. Extending through the coiled portion of the heater wire 89 is an improved type of solder pot 92. This solder pot 92, as better shown in Fig. 8, has a hollow portion which is provided with a fusible material, such as a rather low melting solder 93. This solder melts and so absorbs a certain amount of heat by its change in state from the heater wire 89 before any further change in temperature of the solder pot 92 takes place. At the opposite end of the solder pot there is fastened a ratchet wheel by a slightly higher melting solder so that upon an overload sufficiently high to cause the normal carrying capacity of the heater 89 to be exceeded the ratchet wheel will not be released until the special solder 93 is melted. This prevents actuation of the overload means under overloads over such a short period that no harm would be done to the apparatus. This solder pot 92 and heating coil 89 are mounted upon a second insulating member 95 which is parallel to the other insulating member 75 and which extends between the end portions of the U-shaped bracket 40. This second insulating member 95 carries the overload mechanism. The remaining mechanism of the overload mechanism is mounted at the side of the insulating member 95. This mechanism comprises a formed strip metal slide member 96 which is slidable upon the pins 97 directly beneath and behind an insulating actuating member 98 which is also slidably mounted upon the pins 97 but which is independent of the slide member 96. The slide member 96 is provided with a catch 99 formed of a spring brass strip which is adapted to engage the ratchet wheel 94 when the overload mechanism is set. The member 96 is resiliently urged to the left as viewed in Fig. 3 so that the spring catch 99 is urged in engagement with the teeth of the ratchet wheel 94 by a tension coil spring 102 which has one end connected to an ear 103 extending from the member 96 and the other end connected to a pin 104 extending from the insulating member 95. The member 96 on the opposite side is provided with a pivot pin 100 which extends through an intermediate portion of a floating lever 101. One end of this lever 101 extends into a notch 105 formed in the member 98 and this forms the sole connection between the slide 96 and the member 98, while the other end of the lever 105 extends in an opposite direction beneath an insulating arm 106 which extends from the U-shaped bracket 65 on a side opposite the insulating arm 66.

Figure 5:
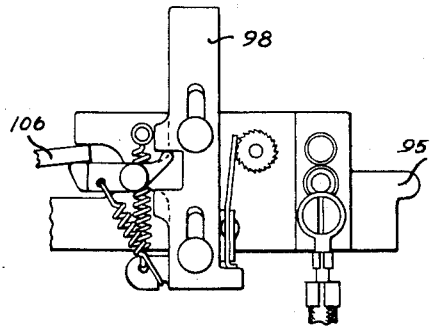
Fig. 5 is a side view of the overload means in tripped position.
Figure 9:
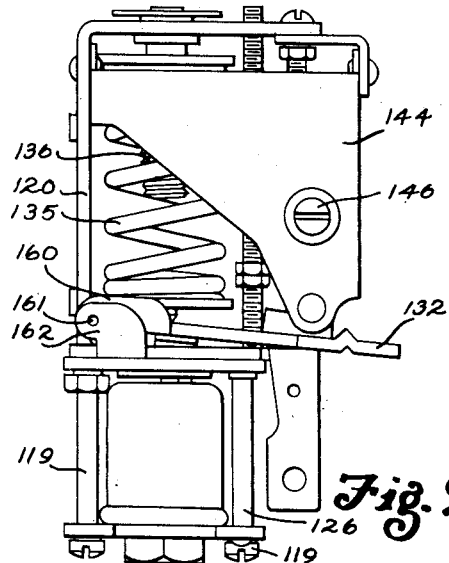
Fig. 9 is a left side view of the high pressure cutout means shown in Fig. 1.
Figure 10:
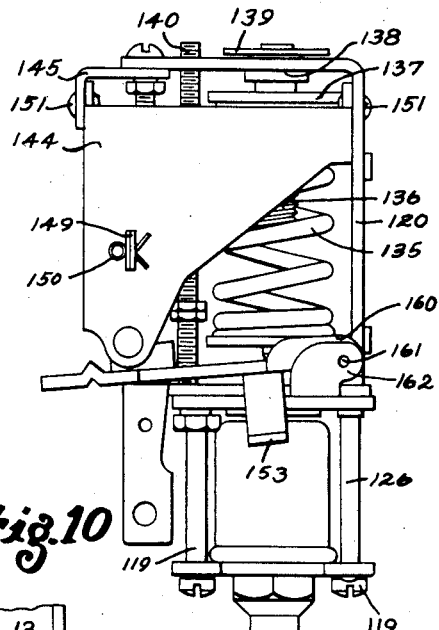
Fig. 10 is a right side view of the high pressure cutout means.
Figure 11:
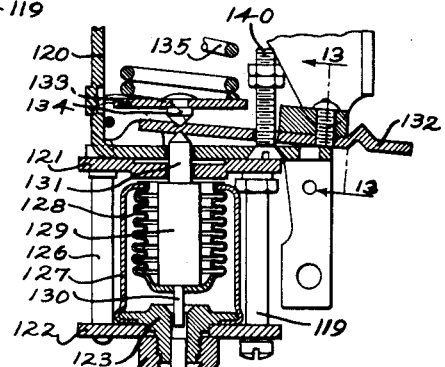
Fig. 11 is a sectional view along the line 11—11 of Fig. 1.
Figure 12:
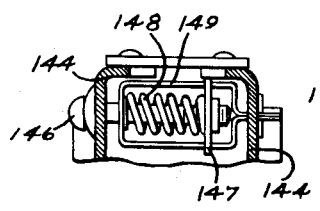
Fig. 12 is a sectional view along the line 12—12 of Fig. 1.
Figure 13:
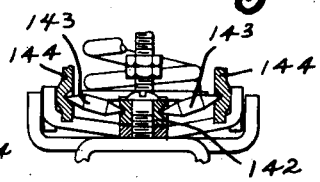
Fig. 13 is a sectional view along the line 13—13 of Fig. 11.
Figure 14:
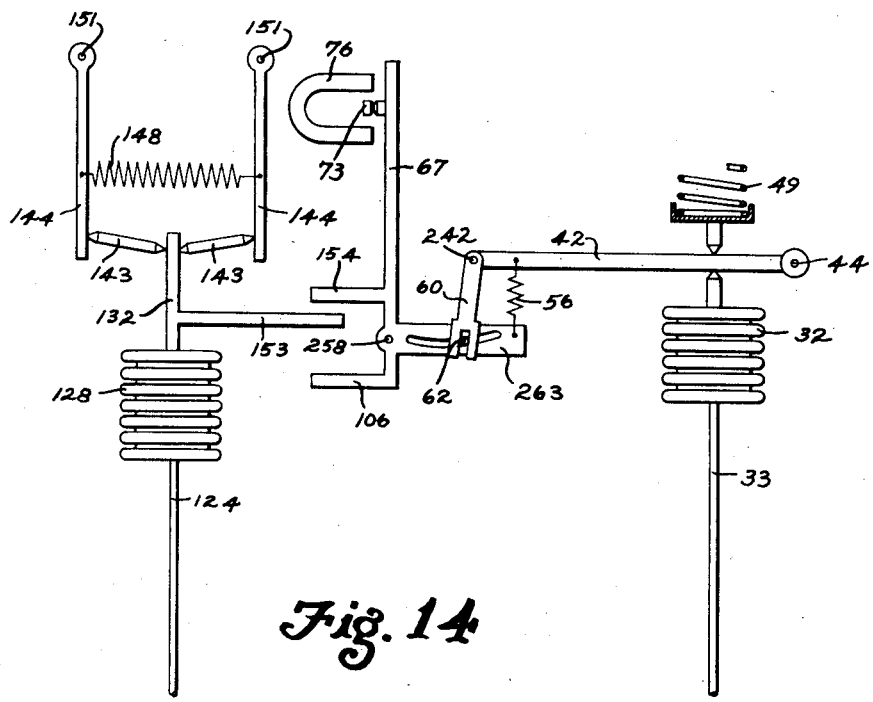
Fig. 14 is a diagrammatic view of the switch mechanism laid out in such a manner as to illustrate the functions and operation of various parts of the mechanism.

When an excessive amount of current flows through the switch and particularly through the heater coil 89, the solder or fusible material 93 will first be melted and then the solder connecting the ratchet wheel with the stem of the solder pot 92 will melt and permit rotation of the ratchet wheel. This will release the spring member 99 and the member 96 and permit the spring 102 to carry the member 96 and the lever 101 toward the left as viewed in Fig. 3, so that an end of the lever 101 will engage the end of the arm 106, as shown in Fig. 5, in order to forcibly move the armature arm 67 and the contact 71 to open circuit position. This movement is permitted regardless of the condition of the bellows 32 by reason of the slot 61 which under the control of the spring 56 permits the movement of the armature arm 67 independently of the movement of the bellows in this direction. This slot and spring connection of the slot 61 and the spring 56 also prevents damage to the armature arm by taking up any excess movement and expansion of the bellows 32 without placing a force upon the armature arm greater than the tension of the spring 57.

Figure 4:
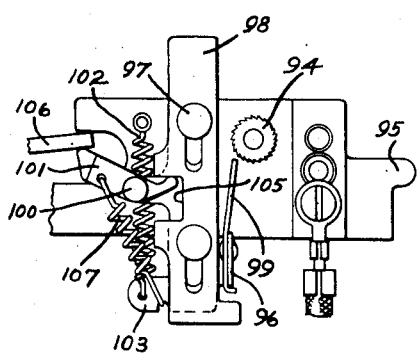
Fig. 4 is a side view of the overload means, also shown in Fig. 3, showing the overload means in resetting position.

In order to reset the overload means, the member 98 is forced directly downwardly as shown in Fig. 4 so that its notch 105 bears upon the one end of the lever 101 against the tension of the spring 107 and so that by the reaction of this force, the other end of the lever 101 contacts with the arm 106 and thereby holds the switch contacts open. The reaction of the force imposed upon the lever 101 by the notch 105 also moves the slide member 96 downwardly against the tension of a spring 102 so that the spring catch 99 is moved beneath the ratchet wheel as viewed in Fig. 4 so that when the member 98 is released the spring catch will rise and engage the ratchet wheel and permit the lever 101 to move away from the arm 106 in order to permit the switch contacts to move to closed position. The member 98 may also be employed to open the contacts by pressing directly down thereon to cause the lever 101 to be turned in a clockwise direction as shown in Fig. 4 to engage the arm 106.

Referring now more particularly to Figs. 1 and 9 to 13 inclusive, there is provided a high pressure cutout mechanism at the left of the pressure responsive mechanism heretofore described. This high pressure cut-out mechanism is provided with a U-shaped bracket 120 similiar to bracket 40 which has a bellows assembly mounted on one end. This bellows assembly has an upper plate 121 and a lower plate 122 riveted together by pins 126 similar to the other bellows assembly. The bellows assembly is fastened to the U-shaped bracket 120 by screws 119 which pass through opposite corners of the upper and lower plates 121 and 122. Fastened to the lower plate is the end plate 123 which carries the high pressure tubing 124 connecting the bellows assembly with the supply conduit 24. Surrounding the upper end of the tubing 124 is a gland nut 125 which fastens the end member 123 to the bottom plate 122. The high pressure tubing 124 is soldered to the end plate 123 to seal the connection.

Connected to the end plate 123 and sealed thereto is a tubular member 127 which is connected at its upper end to the upper end of a bellows 128 located within the cylindrical member 127. Within the bellows 128 is a pin 129 having a reduced portion 130 extending through the closed lower end of the bellows into the central passage within the end plate 123. The upper end of the pin 128 has a reduced portion 131 which extends through a central aperture in the upper plate 121 and an aperture in the U-shaped bracket 120 and has a conical point at its upper end which engages a recess in the bellows follower 132. The bellows follower is a triangular plate provided with a pair of ears 160 receiving a pivot pin 161 which is held by a pair of ears 162 extending from the U-shaped bracket 120. This reduced portion of the pin forms a shoulder which is adapted to engage the upper plate 121 in order to prevent the complete collapse of the bellows 128.

The movement of the bellows 128 and the pin 129 is controlled by resilient adjusting means including a lower spring retainer 133 having a conical point 134 which engages a recess in bellows follower 132 substantially directly opposite the pin 139. Seated on the lower spring retainer 133 is a compression type of coil spring 135 which extends upwardly and surrounds at its upper end an adjusting screw 136 provided with an upper spring retainer 137 which is threaded thereon which receives the upper end of the spring 135. This upper spring retainer 137 is prevented from turning by a projection which extends into a slot provided in the upper vertical portion of the U-shaped bracket 120. The adjusting screw 136 is provided with a flange 138 at its upper end which transmits the thrust of the spring to the U-shaped bracket 120. The upper end of the adjusting screw 136 is provided with a serrated disc 139 which is adapted to receive a key or the control knob 52 or a similar knob in order to turn the adjusting screw 136 which may be provided with means to limit its free rotation to one revolution. In order to strengthen the U-shaped bracket, a threaded pin 140 is provided with extends from the upper portion of the U-shaped bracket to the lower portion of the bracket in order to prevent the spreading of the extremities of the bracket 120.

In order to control the movement of the bellows follower I provide a floating type of snap acting mechanism. At the free end of the bellows follower 132 there is fastened a block 142, better shown in Fig. 13, which is engaged on either side by a conical pointed pin 143. These pins 143 engage recesses in the arms 144 which are pivoted at their ends to the U-shaped bracket 120 at the rear and to an extension 145 therefrom at the front. These arms 144 are pulled together by a spring means which includes a screw 146 extending inwardly from one of the arms and having a plate 147 threaded thereon which supports one end of a compression type coil spring 148 surrounding the screw 146. The other end of the spring 148 bears against the yoke 149 which extends through a slot in the other of the arms and is fastened by a cotter pin 150. With this arrangement a toggle mechanism formed by the conical points 143, the arm 144, and the spring 148 floats upon the pivot pins 151 and in this way is enabled to move laterally to take care of any misalignment between it and the bellows follower without substantially affecting the action of the toggle snap acting mechanism. The bellows follower has an arm 153 extending therefrom (see Fig. 1) which when pressure within the supply line 24 and the bellows assembly is sufficiently high to overcome the force of the spring 135 and the toggle snap acting means is adapted to engage the arm 154 (see Fig. 2) which extends from the U-shaped member 65 in order to move the armature arm 67 to open circuit position regardless of the pressure within the bellows 32. This is permitted by the spring controlled slotted link connection 60. This high pressure cut-out therefore prevents the operation of the refrigerating apparatus under high pressure conditions when it would be dangerous to operate the system.

The U-shaped brackets 40 and 120 are provided with laterally projecting pairs of ears which are employed to fasten the pressure responsive means and the high pressure cut-out assemblies to the rear wall of the control housing 166 provided with the electrical inlet and outlet connections 167 and 168.

If desired, the high pressure cut-out mechanism may be omitted when such is not necessary to protect the apparatus. The overload mechanism may also be omitted if unnecessary. The adjusting screw mechanism for the high pressure cut-out and the temperature and pressure responsive switch means permit a great range of a setting of the control mechanism which is readily effected.

While the form of embodiment of the invention as herein disclosed, constitutes a preferred form, it is to be understood that other forms might be adopted, all coming within the scope of the claims which follow.

What is claimed is as follows:

1. Switch means including means for opening and closing an electric circuit, said means including overload means responsive to a predetermined flow of electric energy through the circuit for opening the circuit, means for resetting said overload means, said resetting means including a floating lever, means for moving the lever, and means operated by the reaction of the lever for resetting the overload means and for holding the circuit open during the resetting of the overload means.

2. Switch means including means for opening and closing an electric circuit, said means including overload means responsive to a predetermined flow of electric energy through the circuit for opening the circuit, means for resetting said overload means, said resetting means including a floating lever, means for applying a force to the lever, means contacting with the lever and operated by the reaction of the lever for resetting the overload means, means contacting the floating lever and operated by the reaction of the floating lever for holding open the electric circuit during the resetting of the overload means.

3. An overload means including heating means energized by the flow of electric energy, thermal responsive latch means influenced by the heating means for preventing the flow of electric energy under predetermined conditions, said thermal means including heat absorbing means adapted to change its state for delaying the operation of the thermal means.

4. An overload means including heating means energized by the flow of electric energy, thermal responsive latch means influenced by the heating means for preventing the flow of electric energy under predetermined conditions, said thermal means including heat absorbing means in the form of a fusible material for delaying the operation of the thermal means.

5. An overload means including heating means energized by the flow of electric energy, a thermal fusible latch means influenced by the heating means for preventing the flow of electric energy under predetermined conditions, said thermal means including heat absorbing means in the form of a fusible material for delaying operation of the thermal means.

6. An overload means including heating means energized by the flow of electric energy, a fusible latch means influenced by the heating means for preventing the flow of electric energy under predetermined conditions, said fusible latch means including heat absorbing means in the form of a material fusible at a lower temperature than the fusible latch means for delaying operation of the thermal means.

7. A switch means including a bellows, a bellows follower, an armature arm carrying a switch contact, a magnet cooperating with the armature arm, and a link having a spring controlled slotted connection for connecting the bellows follower and the armature arm, said spring controlled slotted connection comprising means riding in the slot and a spring for resiliently holding said means in one end of the slot.

8. A switch means including a bellows, a bellows follower, an armature arm carrying a switch contact, a magnet cooperating with the armature arm, and a link having a spring controlled slotted connection for connecting the bellows follower and the armature arm and having an adjusting means cooperating with the spring controlled slotted connection for varying the differential of the switch, said spring controlled slotted connection comprising means riding in the slot and a spring for resiliently holding said means in one end of the slot.

9. A control for a medium to be transmitted including an expansible power element capable of moving in a predetermined path, said expansible member being provided with a follower movable in a predetermined path, a floating snap acting mechanism operably connected to the follower for controlling its movement in its predetermined path, a supporting means for said power member, said floating snap acting mechanism including a plurality of links pivotally connected to the supporting means and extending substantially parallel to the predetermined path of said follower, a set of toggle links pivotally connecting said plurality of links with the follower, a spring means for applying a resilient force to urge said plurality of links toward each other, and means connected to the follower for controlling the transmission of the medium.

10. A control for a medium to be transmitted including an expansible power member, said expansible power member being provided with a follower movable in a predetermined path, a supporting means for said power member, a pair of spaced links pivotally connected at one end to the supporting means and extending generally in the same direction as the predetermined path of the follower, a set of toggle links pivotally connecting the free end of said pair of links with the follower, said set of toggle links extending generally transversely to the path of movement of said follower, a spring means for applying a resilient force to urge said pair of links toward each other, and means connected to the follower for controlling the transmission of the medium.

11. A switch including a set of switch contacts, an expansible power member, said expansible power member being provided with a follower movable in a predetermined path, a mechanical snap acting means connected to the follower for controlling the movement of the follower, said follower being provided with positive means providing a positive connection with one of the contacts for positively operating the set of switch contacts.

12. A switch including a set of switch contacts, an expansible power member, said expansible power member being provided with a follower movable in a predetermined path, a mechanical snap acting means connected to the follower for controlling the movement of the follower, said follower being provided with positive means providing a positive connection with one of the contacts for positively operating the set of switch contacts, a second expansible power member, said second member being provided with means for operating said set of switch contacts independently of the first mentioned power member and follower.

13. In combination, a switch means for controlling the flow of electric energy, means for opening said switch means, a thermal fusible latch means incorporating a fusible material holding a latch means for preventing the operation of said switch opening means, said thermal means including heat absorbing means in the form of a second material fusible at a lower temperature than the fusible latch for delaying the melting of the fusible material holding the latch means.

GEORGE C. PEARCE.